United States Patent [19]

Hwang et al.

[11] Patent Number: 5,692,075
[45] Date of Patent: Nov. 25, 1997

[54] MACH-ZEHNDER TYPE ELECTRO-OPTIC POLYMER MODULATOR IN WHICH AN INITIAL OUTPUT STATE CAN BE CONTROLLED BY POST-PHOTOBLEACHING

[75] Inventors: Wol-Yon Hwang; Jang-Joo Kim, both of Daejeon, Rep. of Korea

[73] Assignee: Electronics and Telecommunications Research Institute, Daejeon, Rep. of Korea

[21] Appl. No.: 736,207

[22] Filed: Oct. 25, 1996

[30] Foreign Application Priority Data

Dec. 21, 1995 [KR] Rep. of Korea .................. 95-53637

[51] Int. Cl.⁶ ...................................................... G02B 6/10
[52] U.S. Cl. ............................................................. 385/3
[58] Field of Search ......................... 385/2, 3, 131, 385/132

[56] References Cited

U.S. PATENT DOCUMENTS

| | | | |
|---|---|---|---|
| 5,278,924 | 1/1994 | Schaffner | 385/3 |
| 5,408,544 | 4/1995 | Seino | 385/3 |
| 5,416,859 | 5/1995 | Burns et al. | 385/3 |
| 5,563,965 | 10/1996 | Madabhushi | 385/3 |

*Primary Examiner*—John Ngo
*Attorney, Agent, or Firm*—Antonelli, Terry, Stout & Kraus, LLP.

[57] ABSTRACT

The invention is related to an improved mach-zehnder type electro-optic polymer modulator which is capable of controlling its initial output state by post-photobleaching method, thus achieving a more stable output characteristic of a device without use of a bias electrode, which includes first and second electrodes formed on an upper portion of first and second arms have different lengths wherein a mach-zehnder type electro-optic polymer modulator.

1 Claim, 4 Drawing Sheets

5,692,075

MACH-ZEHNDER TYPE ELECTRO-OPTIC POLYMER MODULATOR IN WHICH AN INITIAL OUTPUT STATE CAN BE CONTROLLED BY POST-PHOTOBLEACHING

BACKGROUND OF THE INVENTION

1. Field of the Invention

The present invention relates to a mach-zehnder type electro-optic polymer modulator, and particularly to an improved mach-zehnder type electro-optic polymer modulator which is capable of controlling an initial output state by post-photobleaching.

2. Description of the Conventional Art

The conventional mach-zehnder type electro-optic polymer modulator is directed to converting an electrical signal into an optical signal.

FIG. 1A is a plan view showing a conventional mach-zehnder type electro-optic polymer modulator, and FIG. 1B is a vertical cross-sectional view along with the line X—X in FIG. 1A.

As shown in FIGS. 1A and 1B, the conventional mach-zehnder type electro-optic polymer modulator includes a first arm 16b and a second arm 16c which are branched from an input terminal 16a which is extended from an input side of the system, and an output terminal 16d at which the above-mentioned elements are connected to each other. In addition, a signal electrode 18a having a predetermined length is formed at the first arm 16b, and a bias electrode 18b having the same length as the signal electrode 18a is formed at the second arm 16c.

As shown in FIG. 1B, the conventional electro-optic polymer modulator includes a lower electrode layer 12 formed on a semiconductor substrate 11, a lower cladding layer 13, a guiding layer 14, an initial bleached layer for forming a channel waveguide 15, an upper cladding layer 17 and a upper electrode layer 18a.

Generally, the output of the conventional mach-zehnder type electro-optic polymer modulator is dependent on the phase difference between the first arm 16b and the second arm 16c as follows.

$$I_o = E_o^2 = (\tfrac{1}{2})E_{in}^2[1+\cos\{(\phi_1-\phi_2)_0+(\delta\phi_1-\delta\phi_2)\}] \quad (1)$$

where $(\phi_1-\phi_2)_0$ denotes the initial phase difference between the lights passed through the first arm 16b and the second arm 16c, $\delta\phi_1$ denotes the phase change of the first arm 16b which is induced by an external voltage, and $\delta\phi_2$ denotes the phase difference of the second arm 16c which is induced by an external voltage.

This modulator should have a proper initial output state which is set in accordance with the purpose of use, so that a more accurate and efficient conversion from an electrical signal into an optical signal can be made.

However, it is impossible to accurately control the initial phase difference between two arm in real fabrication process. Therefore, one of the electrodes (18a~18b) is used as a bias electrode to control the initial output state. Thereafter, the initial output state of the modulator is controlled by controlling the phase "$(\phi_1-\phi_2)_0-\delta\phi_2$" by applying a proper voltage to the bias electrode 18b.

However, in case that the external bias voltage is applied, it is impossible to get a stable output characteristic of the device due to the dc drift effect.

In this regard, please refer to G. R. Mohlmann et al, SPIE Vol. 1560, Nonlinear Optical Properties of Organic Materials IV, pp 426–433, 1991".

SUMMARY OF THE INVENTION

It is object of the present invention to provide a mach-zehnder type electro-optic polymer modulator which is capable of controlling an initial output state of polymer modulator by a post-photobleaching method and providing a proper structure for post-photobleaching.

To achieve the above objects, in accordance with a preferred embodiment of the present invention, there is provided a mach-zehnder type electro-optic polymer modulator having two electrodes formed on two arms of the modulator, wherein said two electrodes have different length from each other in order to control a initial phase difference between said two arms by using post-photobleaching.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The photobleaching is referred to a phenomenon that a dye doped in polymer matrix is bleached by a light having a predetermined wavelength. In this regard, an article "J. J. Kim et al, Appl. Phys. Lett. 64(25):3488–3490, 1994" introduced the phenomenon in detail. Namely, this is one of well known techniques which is used to fabricate an electro-optic waveguide device. In addition, the post-photobleaching is directed to selectively conducting the photo-bleaching with respect to a predetermined portion of the device after fabricating the device.

Figure 1A:
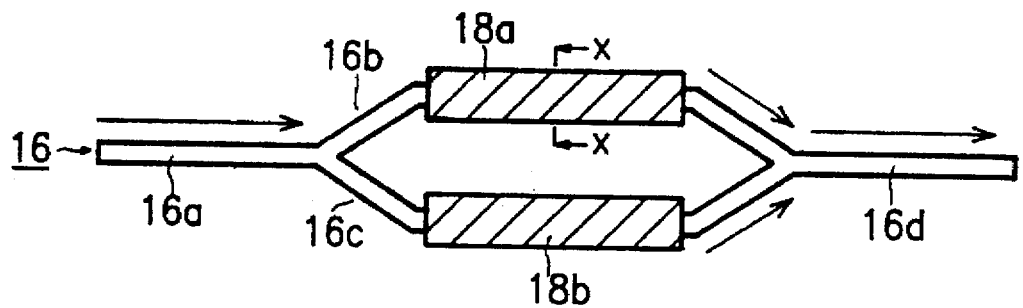
FIG. 1A is a plan view showing a conventional mach-zehnder type electro-optic polymer modulator.
Figure 1B:
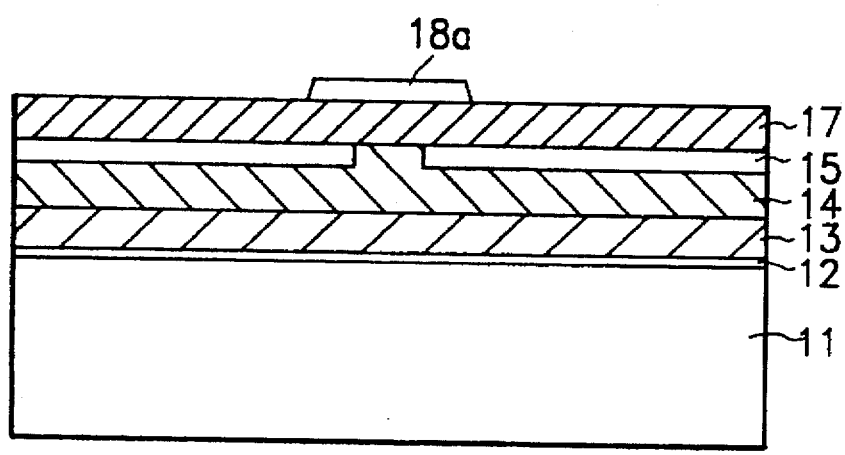
FIG. 1B is a vertical cross-sectional view taken along the line X—X with respect to a first arm of FIG. 1A of the conventional mach-zehnder type electro-optic polymer modulator.
Figure 2:
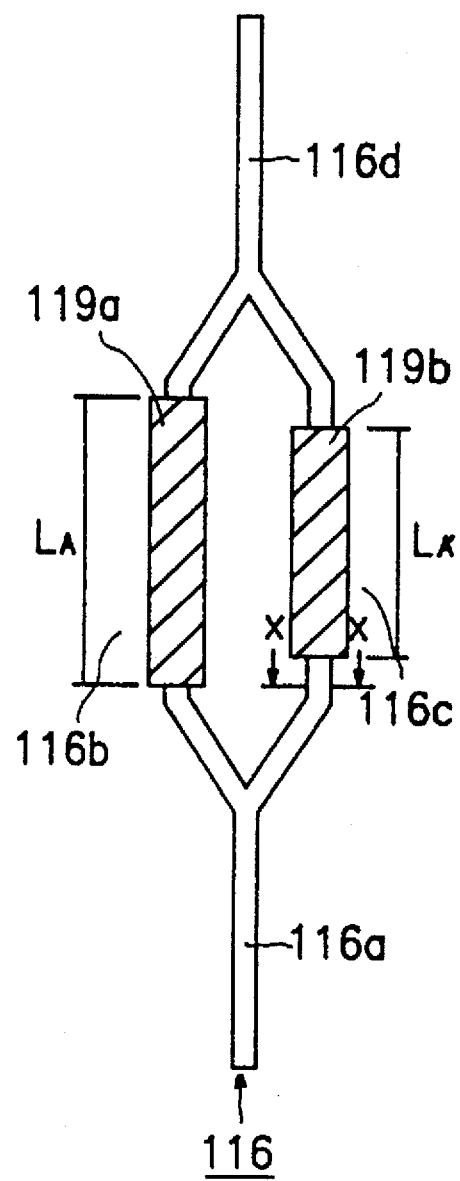
FIG. 2 is a plan view showing the proper electrode structure that is possible to control the initial phase difference between two arms by post-photobleaching methode.

FIG. 2 shows structure that two electrodes of different length are mounted on both arms as a mach-zehnder type electro-optic polymer modulator according to a preferred embodiment of the present invention.

The waveguide 116 of an optical modulator as shown in FIGS. 2 includes a first arm 116b and a second arm 116c which are divided between an input terminal 116a and an output terminal 116d.

A first electrode 119a and a second electrode 119b having different length from each other along the length of the first arm 116b and the second arm 116c are formed at the upper portion of the first arm 116b and the second arm 116c as an upper electrode.

Namely, the length of the electrodes 119a and 119b are different from each other as $L_A$ and $L_{A'}$.

The electrodes formed on the two arms are used as an electrode for applying a electrical signal as well as the metallic mask with respect to the post-photobleaching.

In the present invention, the control method of the initial output state by the post-photobleaching is as follows.

As shown in FIG. 2, when the device is exposed to the post-photobleaching light, the effective refractive index of parts of waveguide which are not covered by the electrodes is reduced by the post-photobleaching.

Therefore, if the lengths $L_A$ and $L_{A'}$ of the first and second electrodes 119a and 119b is different, the initial phase difference between the first and second arms 116b and 116c $(\phi_1-\phi_2)_0$ is changed. Here, the change of the initial phase difference is proportional to the electrode length difference $L_A$ and $L_{A'}$ between the first and second arms 116b and 116c.

Figure 3:
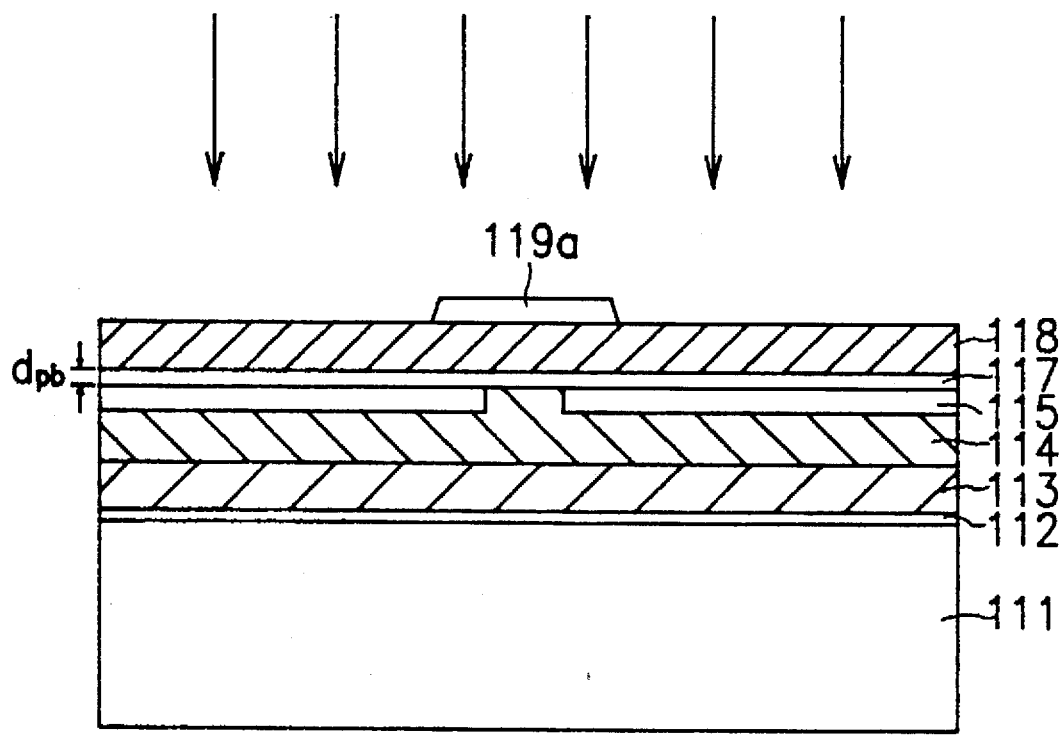
FIG. 3 is a vertical cross-sectional view taken along the line X—X of FIG. 2 of a mach-zehnder type electro-optic polymer modulator after post-photobleaching.

FIG. 3 shows a vertical cross-sectional view taken along the line X—X of FIGS. 2 of a mach-zehnder type electro-optic polymer modulator according to the present invention. In detail, this figure shows the post-photobleaching process of the portion exposed to the post-photobleaching and the vertical cross-section of the part which is post-photobleached.

As shown in FIG. 3, the modulator according to the present invention includes a lower electrode 112 formed on a semiconductor substrate 111, a lower clad layer 113, a guiding layer 114, a initial-photobleaching layer 115, an post photobleaching layer 117, an upper clad layer 118, and a first signal electrode 119a as an upper electrode.

Figure 4:
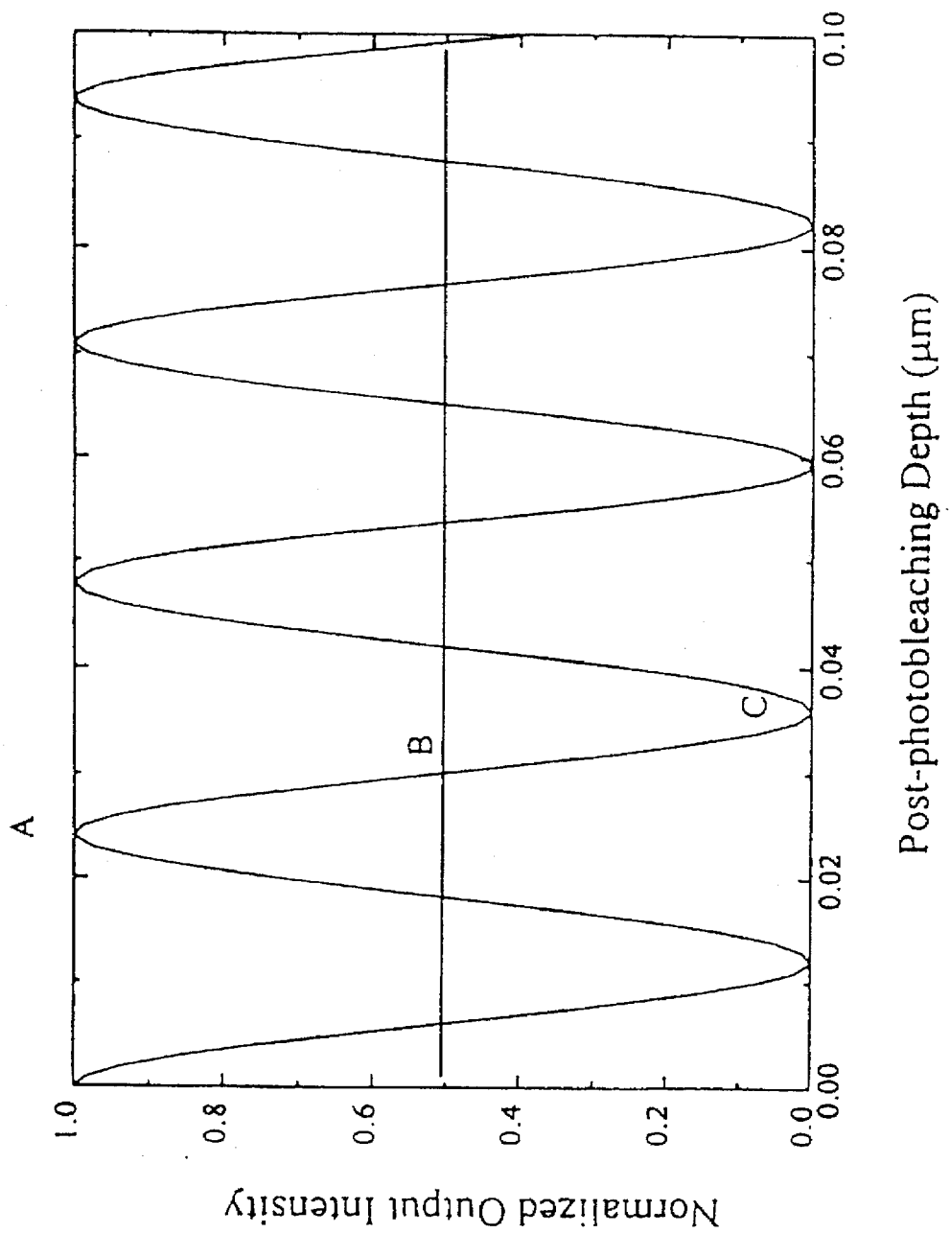
FIG. 4 is a graph showing the example of an initial output state tunning as function of the post-photobleaching depth $d_{pb}$.

FIG. 4 is a graph showing an example of initial output state tunning as function of a post-photobleaching depth $d_{pb}$ which can be controlled by post-photobleaching time. The result is obtained by using the effective refractive method when the length difference $L_A$ and $L_{A'}$ between the first and second electrode 119a and 119b of the first and second arms 116b and 116c shown in FIG. 2 is 15 mm.

In the above computation, the guiding layer was P2ANS (50:50). The lower cladding was P2ANS (35:65). The upper cladding was NOA61. Here, the P2ANS (x:100-x denotes 4-dimethylamino-4'-nitro stilbene methacrylate (P2ANS)-co methylmethacrylate (MMA) (x:100-x). NOA61 is the optical epoxy.

Here, the magnitude of the poling electric field is 1.6 MV/cm, and the refractive indices of each layer are that NP2ANS (50:50)=1.7424, NP2ANS (35:65)=1.6955, and NOA61=1.543. In addition, the initial photobleaching depth $d_{pb}$ is 0.4 µm.

As shown in FIG. 4, the initial output state of the modulator is changed in accordance with the thickness $d_{pb}$ which is controlled by the post-photobleaching time.

Therefore, the modulator according to the present invention is possible to adjust the initial output state by exposing the post-photobleaching light without a dc bias voltage.

Namely, the present invention is basically directed to adjusting the initial output state of the modulator by checking the output state of the modulator and performing a proper post-photobleaching to the modulator.

Although the preferred embodiments of the present invention have been disclosed for illustrative purposes, those skilled in the art will appreciate that various modifications, additions and substitutions are possible, without departing from the scope and spirit of the invention as described in the accompanying claims.

What is claimed is:

1. A mach-zehnder type electro-optic polymer waveguide modulator in which an initial output state can be controlled by post-photobleaching, having two electrodes formed on two arms of the modulator, wherein said two electrodes have different length from each other in order to control a initial phase difference between said two arms by using post-photobleaching.

* * * * *